(12) United States Patent
Mather et al.

(10) Patent No.: US 8,702,146 B1
(45) Date of Patent: Apr. 22, 2014

(54) STOWABLE VEHICLE SEAT

(71) Applicants: Carl Mather, Lake Orion, MI (US);
Kenric P Socks, Leonard, MI (US)

(72) Inventors: Carl Mather, Lake Orion, MI (US);
Kenric P Socks, Leonard, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/633,467

(22) Filed: Oct. 2, 2012

(51) Int. Cl.
*B60N 2/14* (2006.01)
(52) U.S. Cl.
USPC ................................. 296/65.01; 296/65.05
(58) Field of Classification Search
USPC .......... 296/65.01, 65.05, 65.06, 65.07, 65.13; 297/14, 15, 331, 334
See application file for complete search history.

(56) References Cited

U.S. PATENT DOCUMENTS

| | | | |
|---|---|---|---|
| 6,609,745 B2 * | 8/2003 | Miyahara et al. | 296/65.11 |
| 6,869,138 B2 * | 3/2005 | Rhodes et al. | 297/15 |
| 7,108,323 B2 | 9/2006 | Welch et al. | |
| 7,300,090 B2 | 11/2007 | Rana et al. | |
| 7,377,571 B2 | 5/2008 | Ewers et al. | |
| 7,748,766 B2 * | 7/2010 | Villeminey | 296/64 |
| 2002/0017797 A1 | 2/2002 | Jach et al. | |
| 2011/0221239 A1 | 9/2011 | Holdampf et al. | |
| 2013/0062903 A1 | 3/2013 | Mather et al. | |

* cited by examiner

*Primary Examiner* — Joseph Pape
*Assistant Examiner* — Dana Ivey
(74) *Attorney, Agent, or Firm* — Ralph E Smith

(57) ABSTRACT

A vehicle may include a propshaft, a vehicle body and a seat assembly. The propshaft is coupled to a source of rotary power and a rear axle of the vehicle. The source of rotary power may be disposed in a front portion of the vehicle. The vehicle body includes an occupant cabin defined by a floor panel and a back wall panel. The floor panel is disposed above the propshaft and defines a lower boundary of the occupant cabin. The back wall panel extends upward from the floor panel and defines a rearward boundary of the occupant cabin. The seat assembly is disposed above the propshaft and is movable between a seating position and a stowed position. The seat assembly may be at least partially received in a space of the vehicle body that is separate from the occupant cabin when the seat assembly is in the stowed position.

17 Claims, 7 Drawing Sheets

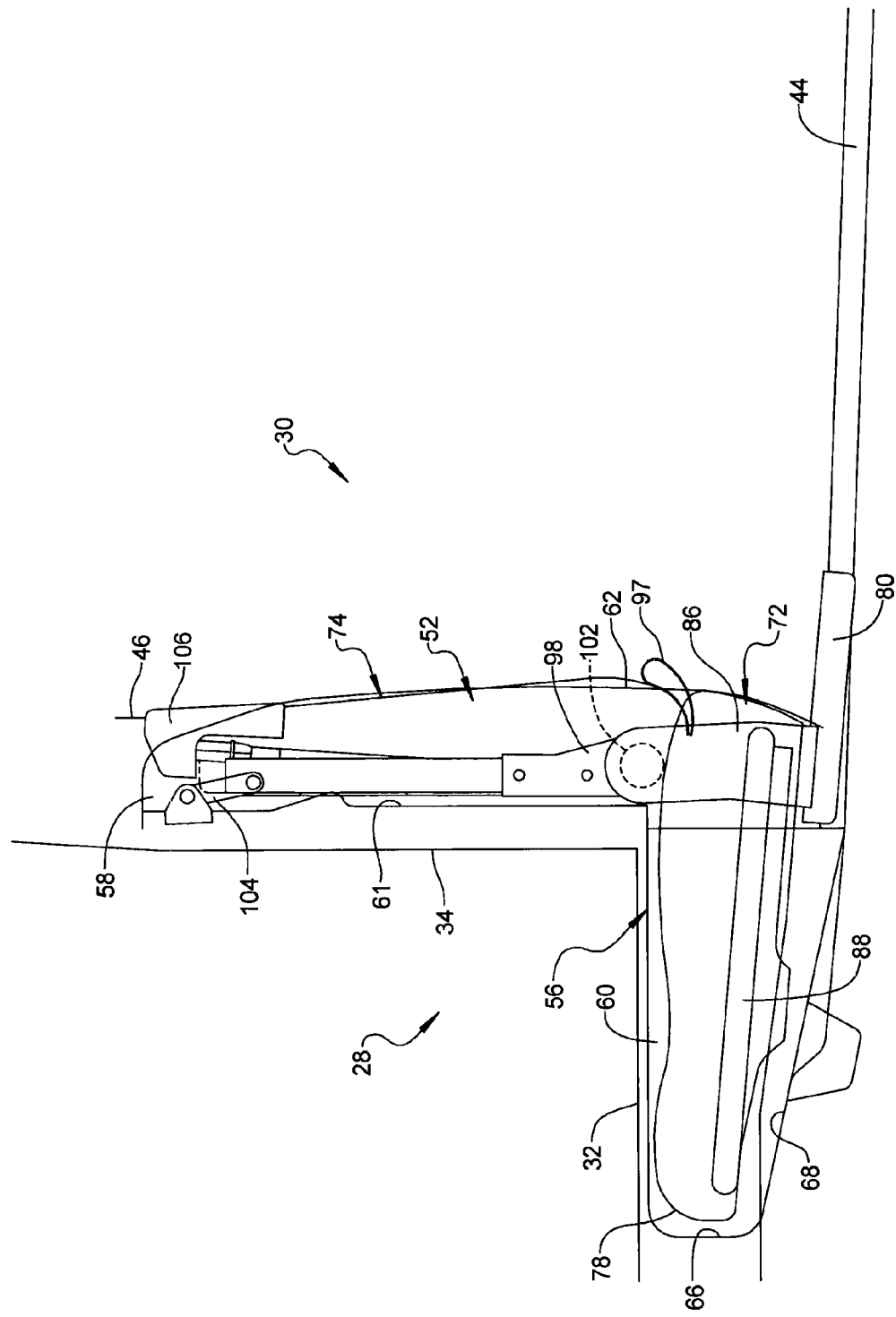

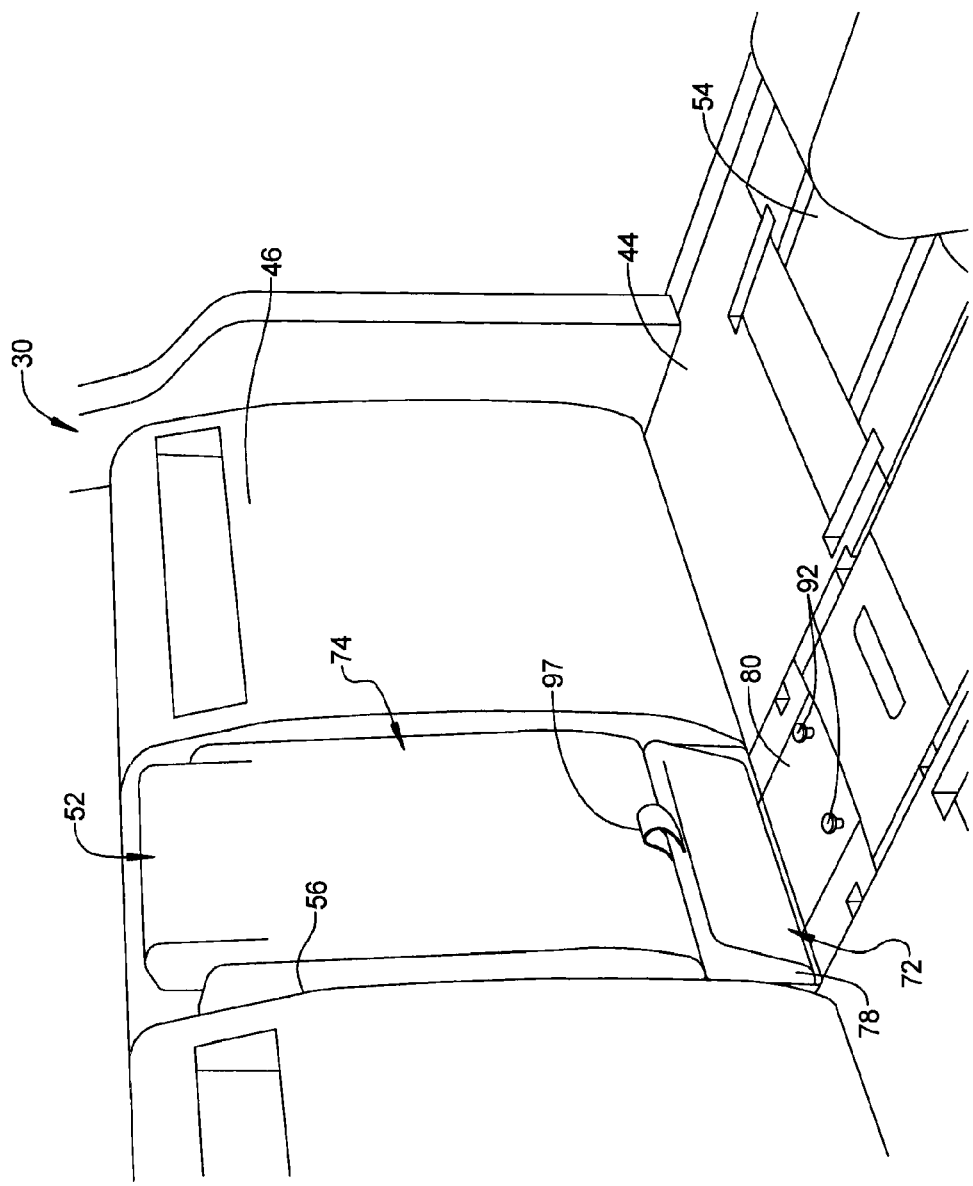

STOWABLE VEHICLE SEAT

FIELD

The present disclosure relates to a stowable seat for a vehicle.

BACKGROUND

Automotive vehicles include seat assemblies for supporting occupants within a cabin of the vehicle. Some seat assemblies are able to be removed from the vehicle by a user or moved by the user between a seating position and a stowed position to tradeoff passenger seating space for additional cargo space within the cabin of the vehicle. Removing seat assemblies from a vehicle can be cumbersome and storage of a removed seat assembly can be troublesome. Stowable seat assemblies provide the convenience of being able to quickly and easily switch between additional seating space and additional cargo space within the cabin of the vehicle without the heavy lifting or storage hassles associated with removable seat assemblies.

SUMMARY

The present disclosure provides a vehicle that may include a propshaft, a vehicle body and a seat assembly. The propshaft may be operatively coupled to a source of rotary power and a rear axle of the vehicle. The source of rotary power may be disposed in a front portion of the vehicle. The vehicle body may include an occupant cabin defined by a floor panel and a back wall panel. The floor panel may be disposed above the propshaft and may define a lower boundary of the occupant cabin. The back wall panel may extend upward from the floor panel and may define a rearward boundary of the occupant cabin. The seat assembly may be disposed above the propshaft and may be movable between a seating position and a stowed position. The seat assembly may be at least partially received in a space of the vehicle body that is separate from the occupant cabin when the seat assembly is in the stowed position.

In some embodiments, the seat assembly may be movable between the seating position and the stowed position without disengaging the seat assembly from the vehicle body.

In some embodiments, the space of the vehicle body may be disposed rearward relative to the back wall panel.

In some embodiments, the space of the vehicle body in which the center seat is received may be generally L-shaped and may include a generally vertically extending portion and a generally horizontally extending portion. In some embodiments, the vertically extending portion may be disposed between the back wall panel and a cargo bed of the vehicle. In some embodiments, the horizontally extending portion may be disposed between the floor panel and the cargo bed of the vehicle.

In some embodiments, the vehicle may include a pair of laterally outboard seat assemblies adjacent the seat assembly and on opposite sides of the seat assembly. The outboard seat assemblies and the seat assembly may form a row of seats. In some embodiments, the outboard seats may be movable between outboard seating positions and outboard stowed positions. The outboard seats may be disposed in compartments beneath the floor panel when the outboard seats are in the outboard stowed position. In some embodiments, at least a portion of each of the compartments is vertically aligned with the propshaft.

In some embodiments, the seat assembly may include a seatback and a seat cushion. The seatback may be pivotable relative to the back wall panel into the vertically extending portion when moving between the seating and stowed positions. The seat cushion may be horizontally slidable relative to the floor panel into the horizontally extending portion when moving between the seating and stowed positions.

In some embodiments, the seat cushion may include a linkage that moves the seat cushion to a position that is outside of the horizontally extending portion and horizontally aligned with the horizontally extending portion.

In some embodiments, the seat cushion may include a base plate having slots that slidably receive corresponding cleats to limit an amount of forward travel of the seat cushion.

In another form, the present disclosure provides a vehicle that may include a vehicle body and a row of seats. The vehicle body may include a cabin defined by a floor panel and a back wall panel. The floor panel may define a lower boundary of the cabin. The back wall panel may extend upward from the floor panel and may define a rearward boundary of the cabin. The row of seats may include two laterally outboard seats and a center seat disposed between the outboard seats. The center seat may be movable between a seating position and a stowed position without disengaging the center seat from the vehicle body. The center seat may be at least partially received in a space of the vehicle body disposed outside of the cabin when the center seat is in the stowed position.

In some embodiments, the space in which the center seat is received may be disposed above the floor panel. In some embodiments, the space may be generally L-shaped and may include a generally vertically extending portion and a generally horizontally extending portion.

In some embodiments, the center seat may include a seatback and a seat cushion. The seatback may be pivotable relative to the back wall panel into the vertically extending portion when moving between the seating and stowed positions. The seat cushion may be horizontally slidable relative to the floor panel into the horizontally extending portion when moving between the seating and stowed positions.

In some embodiments, the seatback may include a pivotable link that moves the seatback into an out of the vertically extending portion. In some embodiments, the seat cushion may include a linkage that moves the seat cushion to a position that is outside of the horizontally extending portion and horizontally aligned with the horizontally extending portion.

In some embodiments, the seat cushion may include a base plate having slots that slidably receive corresponding cleats to limit an amount of forward travel of the seat cushion.

In some embodiments, the vertically extending portion may be disposed between the back wall panel and a cargo bed of the vehicle.

In some embodiments, the horizontally extending portion may be disposed between the floor panel and the cargo bed of the vehicle.

In some embodiments, the outboard seats may be movable between an outboard seating position and an outboard stowed position. The outboard seats may be disposed in compartments beneath the floor panel when the outboard seats are in the outboard stowed position. In some embodiments, at least a portion of each of the compartments is vertically aligned with a propshaft disposed below the floor panel. The propshaft may be drivingly coupled to a rear axle of the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 6 is a partial schematic side view of the body of the vehicle with the rear, center seat assembly shown in a stowed position according to the principles of the present disclosure; and FIG. 7 is a partial perspective view of an occupant cabin of the vehicle with the rear, center seat assembly shown in a stowed position according to the principles of the present disclosure.

DETAILED DESCRIPTION

Figure 1:
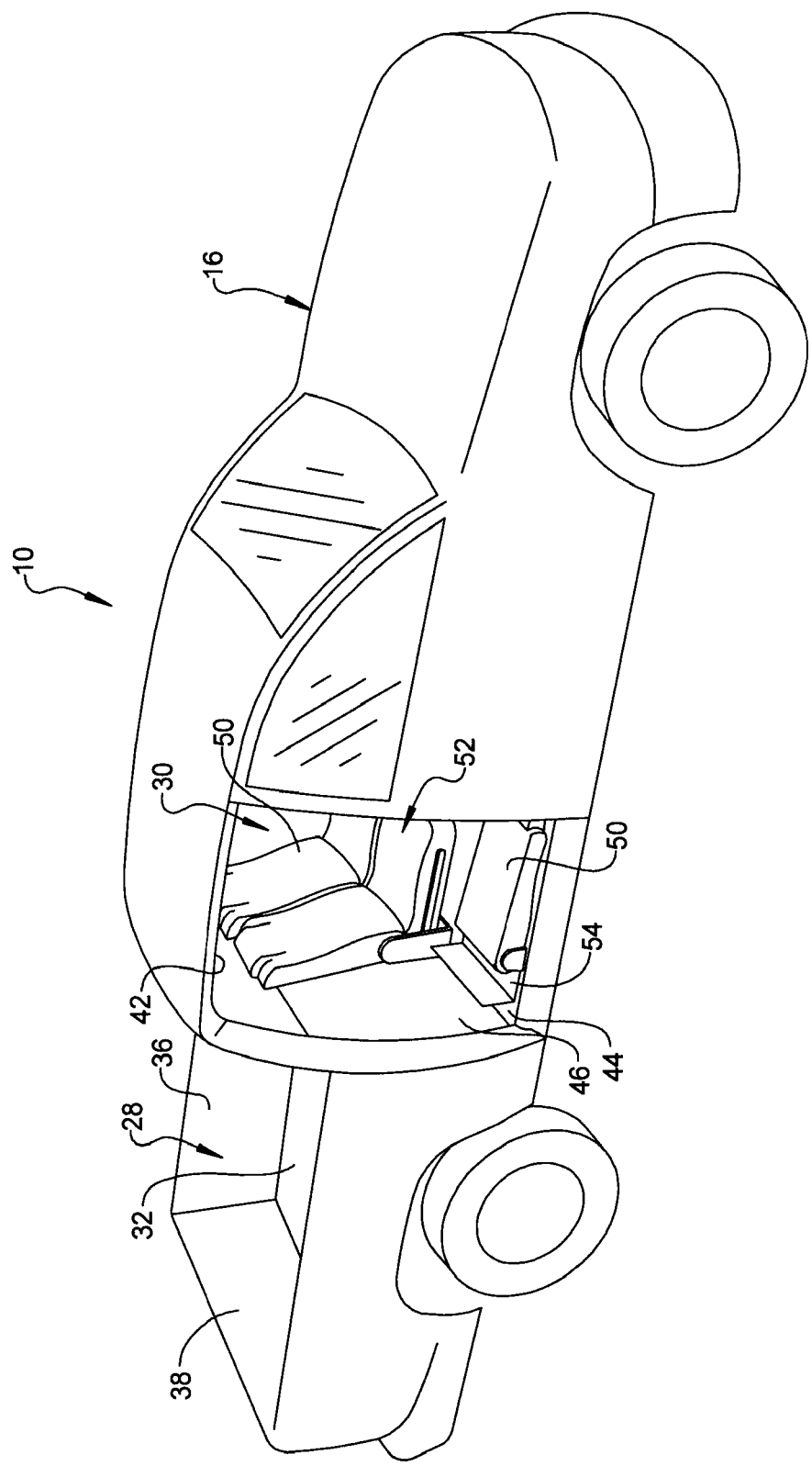
FIG. 1 is a perspective view of a vehicle having seat assemblies according to the principles of the present disclosure.
Figure 2:
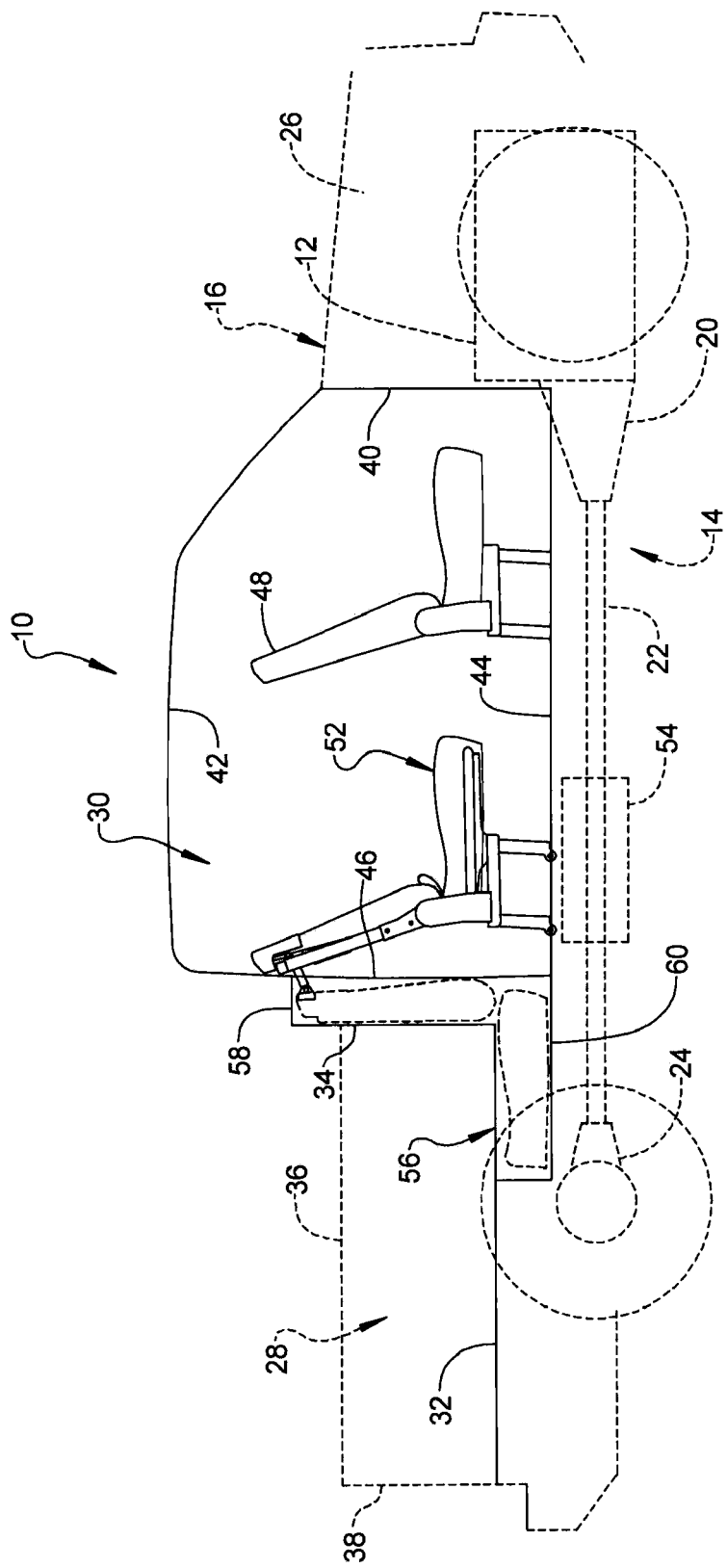
FIG. 2 is a schematic representation of the vehicle of FIG. 1.

In an exemplary embodiment and with reference to FIGS. 1 and 2, a vehicle 10 is provided that may include a source of rotary power 12 (e.g., an engine and/or an electric motor), a drivetrain 14, and a body 16. The drivetrain 14 may be a rear-wheel-drive, four-wheel-drive or all-wheel-drive system, for example, and may include a transmission 20, a propshaft 22 and a rear axle assembly 24. The transmission 20 may be operatively connected to the source or rotary power 12. The propshaft 22 may be operatively connected with the transmission 20 and may transmit rotary power from the source or rotary power 12 to the rear axle assembly 24. As will be subsequently described, a rear, center seat assembly 52 of the vehicle 10 may be movable within the body 16 between a seating position (shown in solid lines in FIG. 2) and a stowed position (shown in phantom lines in FIG. 2). The rear, center seat assembly 52 may be stowed in a position that avoid the propshaft 22 and occupies little or no space within an occupant cabin 30 of the vehicle 10. It will be appreciated, however, that the principles of the present disclosure are also applicable to front-wheel-drive vehicles (i.e., vehicles that do not include a propshaft disposed below a rear, center seat assembly).

The body 16 of the vehicle 10 may include a front-end compartment 26, a cargo bed 28, and the occupant cabin 30. The front-end compartment 26 may house the source of rotary power 18. The cargo bed 28 may be an open compartment disposed in a rear portion of the vehicle 10 and may include a floor 32, a back wall 34, a pair of side walls 36 and a tailgate 38.

The occupant cabin 30 may be a space bounded by a front-end panel 40, a ceiling panel 42, a floor panel 44 and a back-wall panel 46. The occupant cabin 30 may include one or more front seat assemblies 48 (FIG. 2), a pair of rear, laterally outboard seat assemblies 50 (FIG. 1), and the rear, center seat assembly 52. The rear, laterally outboard seat assemblies 50 may be disposed on either side of the rear, center seat assembly 52 and may cooperate with the rear, center seat assembly 52 to form a row of seats. The rear, laterally outboard seat assemblies 50 may be individually movable between seating positions and stowed positions in which each rear, laterally outboard seat assembly 50 may be received in respective compartments 54 disposed beneath the floor panel 44 and on either side of the propshaft 22. The rear, laterally outboard seat assemblies 50 may be Stow 'n Go seats (by Chrysler Group LLC) or the rear, laterally outboard seat assemblies 50 may be of the type disclosed in Assignee's commonly owned U.S. Pat. No. 7,377,571, for example, the disclosure of which is hereby incorporated by reference herein. It will be appreciated that the rear, laterally outboard seat assemblies 50 may include any other suitable mechanism for stowing the rear, laterally outboard seat assemblies 50 in the compartments 54.

Referring now to FIGS. 2-7, the rear, center seat assembly 52 may be stowable between a seating position (shown in FIG. 4 and in solid lines in FIG. 2) and a stowed position (shown in FIGS. 6 and 7 and in phantom lines in FIG. 2). The rear, center seat assembly 52 may be at least partially received in a space 56 (shown in FIGS. 2 and 4-6) defined by the vehicle body 16 that is disposed outside of the occupant cabin 30 (e.g., rearward of the rear boundary of the occupant cabin 30) when the rear, center seat assembly 52 is in the stowed position.

The space 56 may be a generally L-shaped space including a vertical portion 58 and a horizontal portion 60. The vertical portion 58 may be disposed between the back-wall panel 46 of the occupant cabin 30 and the back wall 34 of the cargo bed 28 and may include a rear face 61 and an opening 62 in communication with the occupant cabin 30. The horizontal portion 60 may include an open end 64, a closed end 66, a bottom surface 68 and a top surface 70. The open end 64 may be in communication with the occupant cabin 30 and may be generally aligned with the opening 62 of the vertical portion 58. The bottom surface 68 may be disposed above the propshaft 22 and may be substantially coplanar with the floor panel 44 of the occupant cabin 30 or slightly above or below the floor panel 44. The bottom and top surfaces 68, 70 may be disposed below the floor 32 of the cargo bed 28.

The rear, center seat assembly 52 may be disposed above the propshaft 22 (i.e., the propshaft 22 is disposed below the floor panel 44 and the rear, center seat assembly 52). The rear, center seat assembly 52 may include a seat bottom 72 and a seatback 74. The seat bottom 72 may include a seat bottom frame 76 and a seat cushion 78. The seat bottom frame 76 may include a first base plate 80, a pair of first links 82, a pair of second links 84, a pair of arms 86, and a second base plate 88. The arms 86 may extend upward from sides of the first base plate 80 and may selectively pivotably engage the seatback 74. The first and second links 82, 84 may be pivotably connected to the first base plate 80 and pivotably connected to the floor panel 44 of the occupant cabin 30. In this manner, the first and second links 82, 84, the first base plate 80 and the floor panel 44 cooperate to form a linkage that moves the seat bottom 72 between a raised position in which the seat cushion 78 is spaced apart from the floor panel 44 (shown in FIG. 4) and a lowered position in which the seat cushion 78 may be generally aligned with the horizontal portion 60 of the space 56 (shown in FIG. 5). When the seat bottom 72 is in the lowered position, the first and second links 82, 84 may be received in slots in the floor panel 44 so that the first and second links 82, 84 may be generally flush with the floor panel 44.

The second base plate 88 may be fixedly attached to the seat cushion 78 and may be slidably attached to the first base plate 80. The second base plate 88 may be slidable relative to the first base plate 80 between a forward position (shown in FIGS. 3-5) and a rearward position (shown in FIGS. 6 and 7). The second base plate 88 may include slots 90 that may receive corresponding cleats 92 that extend upward from the first base plate 80. Engagement between the cleats 92 and the slots 90 may limit an amount of forward travel of the second base plate 88 (and hence the seat cushion 78) relative to the first base plate 80. When the cleats 92 are fully received within the slots (i.e., when the second base plate 88 is in the forward position shown in FIG. 3), friction between the cleats 92 and detents in the slots 90 may restrict the second base plate 88 and seat cushion 78 from sliding rearward relative to the first base plate 80 until a predetermined minimum amount of force is applied to the seat cushion 78 to release the engagement between the cleats 92 and slots 90. It will be appreciated that additional or alternative locking mechanisms could be employed to releasably secure the second base plate 88 relative to the first base plate 80 until relative movement therebetween is desired.

Figure 3:
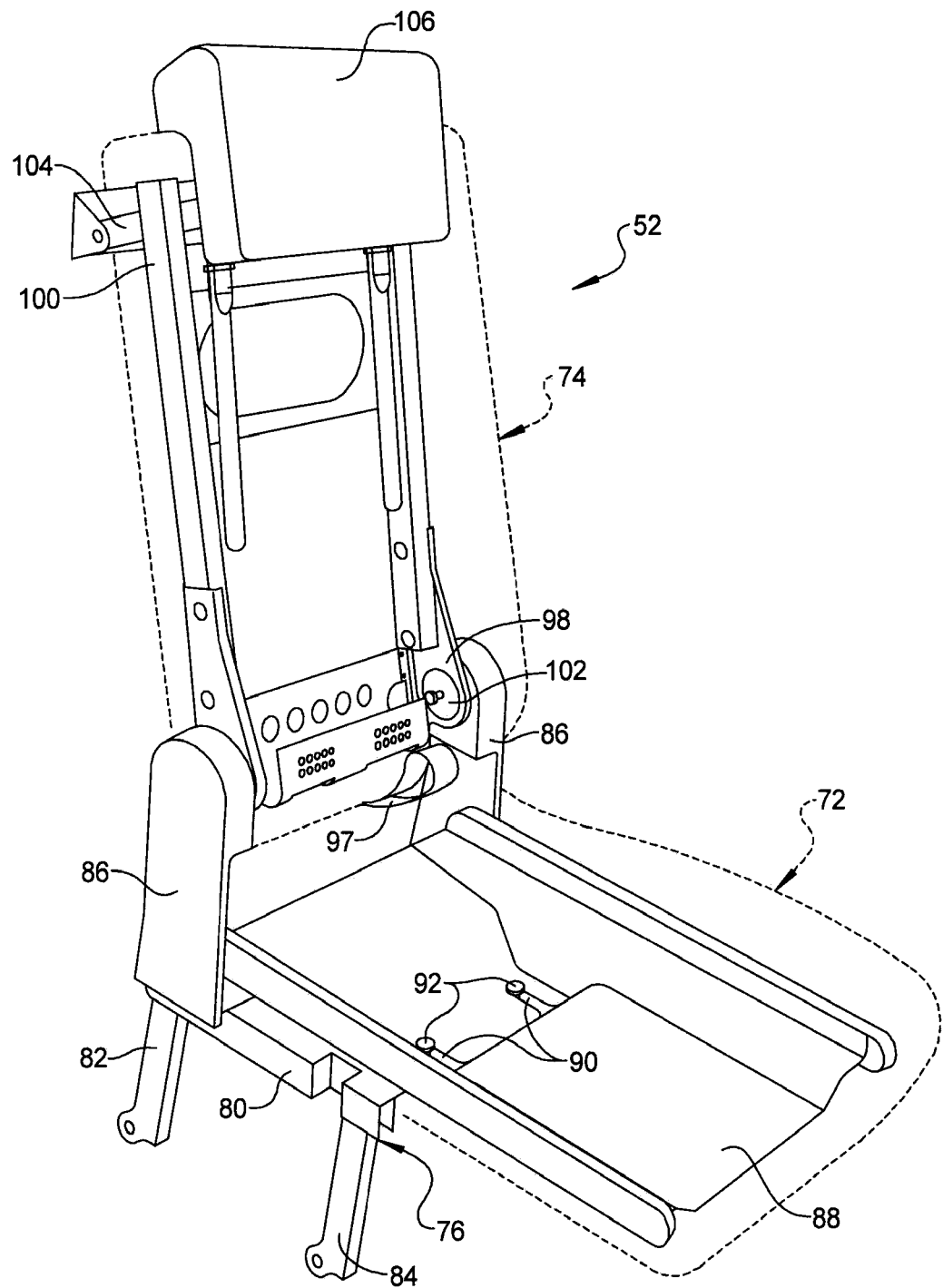
FIG. 3 is a perspective view of a rear, center seat assembly of the vehicle according to the principles of the present disclosure.
Figure 4:
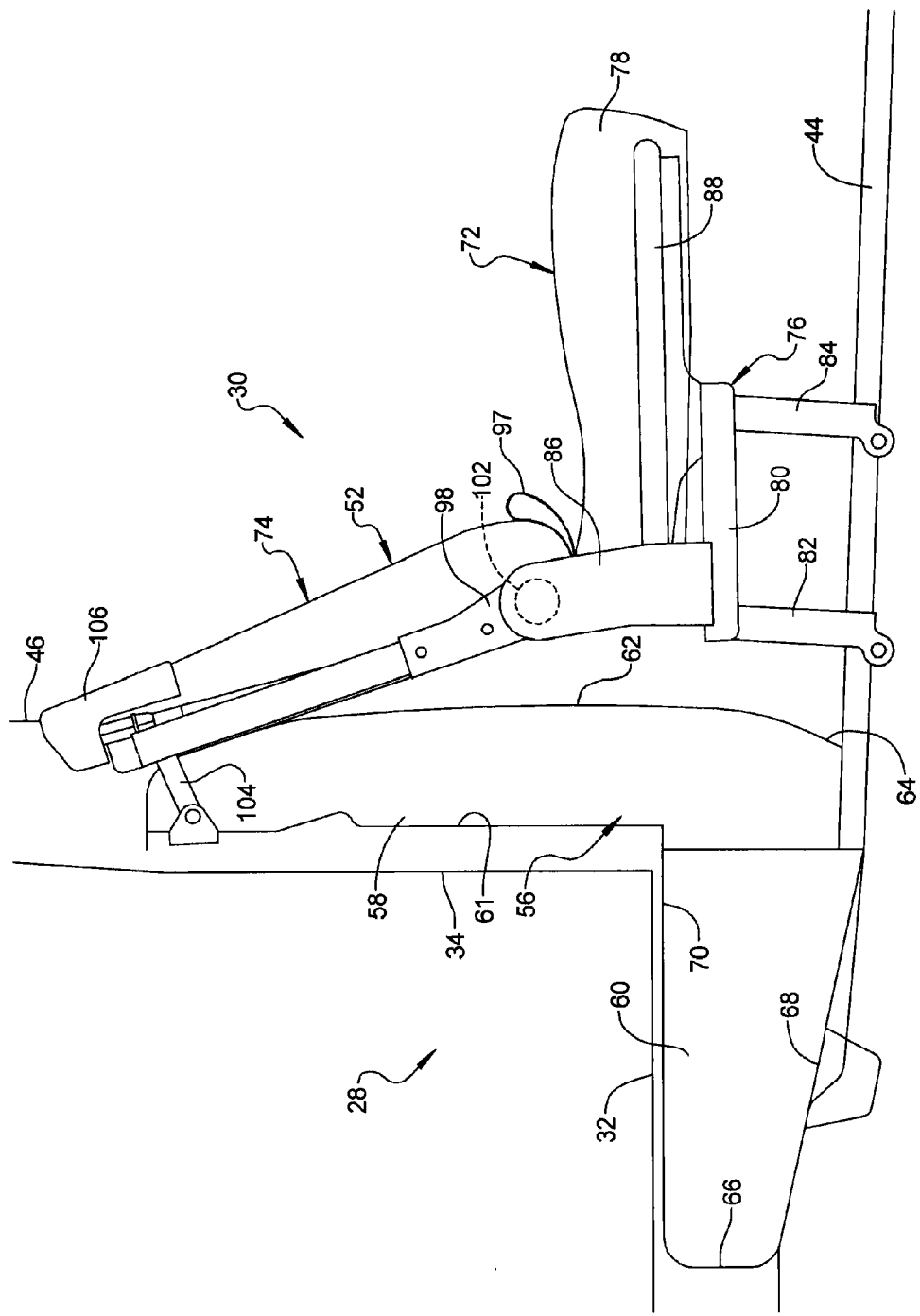
FIG. 4 is a partial schematic side view of a body of the vehicle with the rear, center seat assembly shown in a seating position according to the principles of the present disclosure.

The seatback 74 may include a back-support cushion 94 and a seatback frame 96. A handle 97 may extend outward from the back-support cushion 94 and may be grasped by a user when moving the rear, center seat assembly 52 from the stowed position (FIGS. 6 and 7) to the seating position (FIGS. 3 and 4). The seatback frame 96 may include a lower end 98 and an upper end 100. The lower end 98 may be engaged with the arms 86 of the seat bottom frame 76. The lower end 98 may be selectively rotatable relative to the arms 86. A locking mechanism 102 (shown schematically in FIGS. 3-6) may lock the lower end 98 relative to the arms 86 to prevent relative rotation therebetween when the rear, center seat assembly 52 is in the seating position (FIGS. 3 and 4). The locking mechanism 102 may be selectively unlocked to allow relative rotation between the seatback 74 and the seat bottom frame 76, thereby allowing rotation of the first and second links 82, 84 toward the lowered position shown in FIG. 5. It will be appreciated that the locking mechanism 102 could be any suitable type of locking mechanism to selectively allow and prevent relative rotation between the seat bottom 72 and the seatback 74. For example, the locking mechanism 102 could be similar to a locking mechanism commonly employed in seat dumping or reclining mechanisms.

The upper end 100 of the seatback frame 96 may be pivotably connected to a pair of third links 104 that may be pivotably connected to the rear face 61 of the vertical portion 58 of the space 56. The seatback 74 may also include a headrest 106 that may be slidable up and down relative to the seatback frame 96.

With reference to FIGS. 4-7, operation of the rear, center seat assembly 52 will be described in detail. As described above, the rear, center seat assembly 52 may be movable between a seating position (shown in FIG. 4) and a stowed position (shown in FIGS. 6 and 7) without disengaging the rear, center seat assembly 52 from the vehicle body 16. In the stowed position, the rear, center seat assembly 52 does not encroach on a space occupied by the propshaft 22 in a conventional vehicle and occupies little or no space within the occupant cabin 30 of the vehicle 10.

Figure 5:
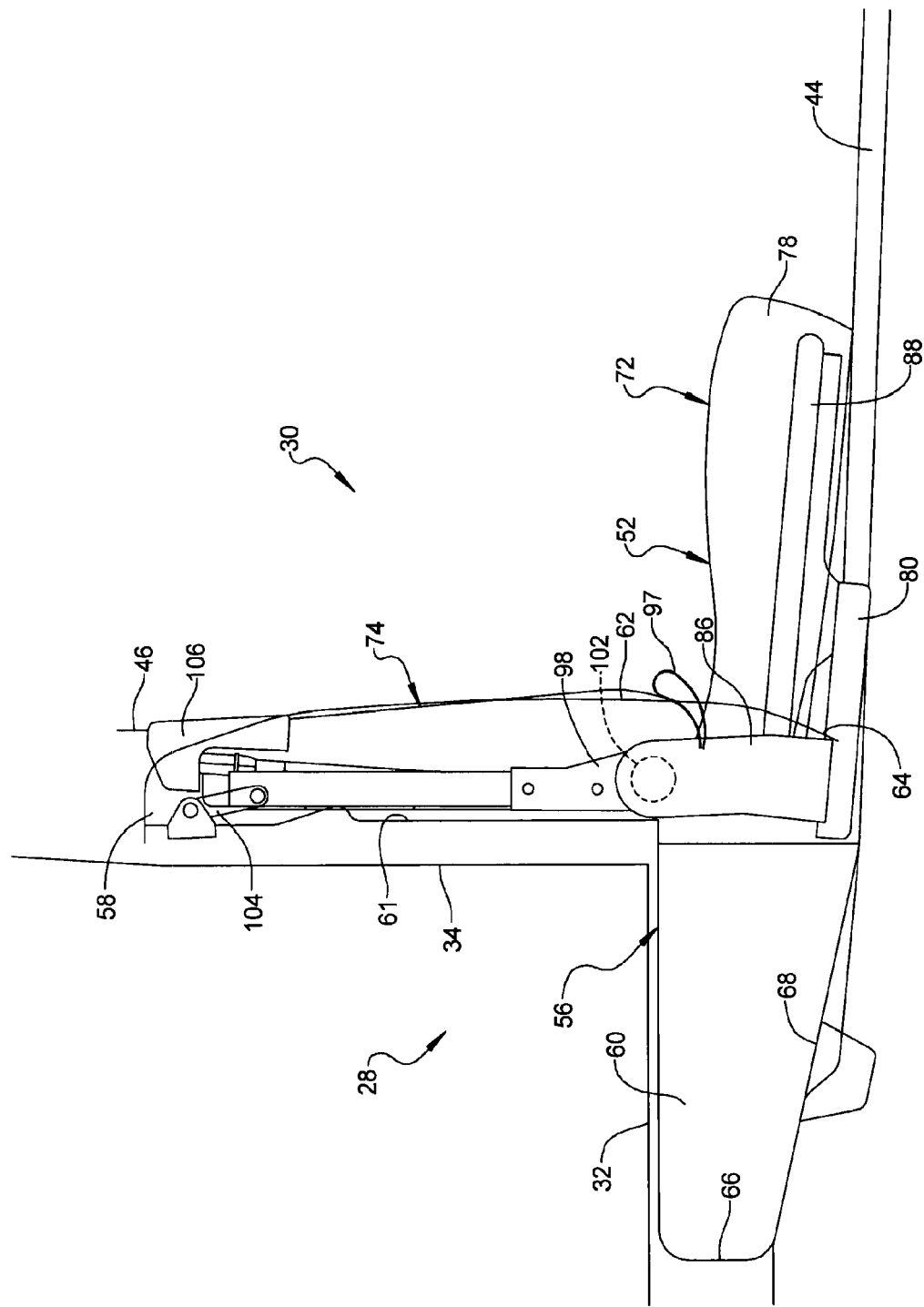
FIG. 5 is a partial schematic side view of the body of the vehicle with the rear, center seat assembly shown in an intermediate position according to the principles of the present disclosure.

To move the rear, center seat assembly 52 from the seating position to the stowed position, a user may first unlock the locking mechanism 102 to allow the seatback 74 to rotate relative to the seat bottom frame 76. Once the locking mechanism 102 is unlocked, the first, second and third links 82, 84, 104 are able to be rotated toward the positions shown in FIG. 5. That is, the seatback 74 can be moved into the vertical portion 58 of the space 56 and the seat cushion 78 can be moved into the lowered position in which the seat cushion 78 may be generally aligned with the horizontal portion 60 of the space 56 (as shown in FIG. 5). Next, the seat cushion 78 can be slid relative to the seat bottom frame 76 into the horizontal portion 60 of the space 56, as shown in FIGS. 6 and 7.

To move the rear, center seat assembly 52 from the stowed position to the seating position, the user may reverse the steps described above. First, the user may pull the seat cushion 78 out of the horizontal portion 60 of the space 56 toward the front end of the vehicle 10 until the cleats 92 are fully received in the slots 90 in the second base plate 88 (i.e., in the position shown in FIG. 5). While not shown in the figures, a handle could be formed on the seat cushion 78 that the user may grasp and pull on to slide the seat cushion 78 out of the horizontal portion 60 of the space 56.

Next, the user may grasp and pull on the handle 97 of the seatback 74 (or grasp and pull on any other structure of the rear, center seat assembly 52) to rotate the first, second and third links 82, 84, 104 from the position shown in FIG. 5 to the seating position shown in FIG. 4. Upon reaching the seating position, the locking mechanism 102 may lock the seatback 74 relative to the arms 86 to lock the rear, center seat assembly 52 in the seating position. Once the rear, center seat assembly 52 is in the seating position, the position of the headrest 106 can be adjusted as desired to suit a particular passenger of the vehicle 10.

While the rear, laterally outboard seat assemblies 50 are described above as being stowable in the compartments 54 below the floor panel 44, in some embodiments, the space 56 may be laterally wide enough to receive the rear, laterally outboard seat assemblies 50 in addition to the rear, center seat assembly 52. In such embodiments, the structure of the rear, laterally outboard seat assemblies 50 may be similar to that of the rear, center seat assembly 52 described above to facilitate movement into and out of the space 56. Furthermore, in some embodiments, the rear, laterally outboard seat assemblies 50 and the rear, center seat assembly 52 may be combined into a single, integrated seat assembly that is movable, as a whole, into and out of the space 56.

What is claimed is:

1. A vehicle comprising:
   a propshaft operatively coupled to a source of rotary power and a rear axle of the vehicle, the source of rotary power being disposed in a front portion of the vehicle;
   a vehicle body including an occupant cabin defined by a floor panel and a back wall panel, the floor panel disposed above the propshaft and defining a lower boundary of the occupant cabin, the back wall panel extending upward from the floor panel and defining a rearward boundary of the occupant cabin; and
   a seat assembly disposed above the propshaft and movable between a seating position and a stowed position, the seat assembly being received in a space of the vehicle body that is separate from the occupant cabin when the seat assembly is in the stowed position,
   wherein the space of the vehicle body is disposed between the back wall panel and a rear end of the vehicle,
   wherein the space of the vehicle body is generally L-shaped and includes a generally vertically extending portion and a generally horizontally extending portion,
   wherein the seat assembly includes a seatback and a seat cushion, the seatback being pivotable relative to the back wall panel into the vertically extending portion when moving between the seating and stowed positions, the seat cushion being horizontally slidable relative to the floor panel into the horizontally extending portion when moving between the seating and stowed positions.

2. The vehicle of claim 1, wherein the seat assembly is movable between the seating position and the stowed position without disengaging the seat assembly from the vehicle body.

3. The vehicle of claim 1, wherein the vertically extending portion is disposed between the back wall panel and a cargo bed of the vehicle, and wherein the horizontally extending portion is disposed between the floor panel and the cargo bed of the vehicle.

4. The vehicle of claim 3, further comprising a pair of laterally outboard seat assemblies adjacent the seat assembly and on opposite sides of the seat assembly, the pair of laterally outboard seat assemblies and the seat assembly forming a row of seats, and wherein the pair of laterally outboard seat assemblies are movable between outboard seating positions and outboard stowed positions, and wherein the pair of laterally outboard seat assemblies are disposed in compartments in the vehicle body beneath the floor panel when the pair of laterally outboard seat assemblies are in the outboard stowed positions.

5. The vehicle of claim 4, wherein at least a portion of each of the compartments is vertically aligned with the propshaft.

6. The vehicle of claim 1, wherein the seat cushion includes a linkage that moves the seat cushion to a position that is outside of the horizontally extending portion and horizontally aligned with the horizontally extending portion.

7. The vehicle of claim 6, wherein the seat cushion includes a first base plate that is slidable relative to a second base plate, the first base plate having slots that slidably receive corresponding cleats extending from the second base plate to limit an amount of forward travel of the seat cushion relative to the second base plate.

8. A vehicle comprising:
a vehicle body including a cabin defined by a floor panel and a back wall panel, the floor panel defining a lower boundary of the cabin, the back wall panel extending upward from the floor panel and defining a rearward boundary of the cabin; and
a row of seats including two laterally outboard seats and a center seat disposed between the two laterally outboard seats, the center seat including a seatback, a seat bottom, and a linkage allowing the center seat to move between a seating position and a stowed position without disengaging the center seat from the vehicle body, the seat bottom of the center seat being received in a space of the vehicle body disposed outside of the cabin when the center seat is in the stowed position,
wherein the space is disposed above the floor panel.

9. The vehicle of claim 8, wherein the space is disposed between the back wall panel and a rear end of the vehicle.

10. The vehicle of claim 9, wherein the space of the vehicle body is generally L-shaped and includes a generally vertically extending portion and a generally horizontally extending portion.

11. The vehicle of claim 10, wherein the seatback is pivotably coupled to the back wall panel and movable into the vertically extending portion when moving between the seating and stowed positions, the seat bottom being horizontally slidable relative to the floor panel into the horizontally extending portion when moving between the seating and stowed positions.

12. The vehicle of claim 11, wherein the seatback includes a pivotable link that moves the seatback into an out of the vertically extending portion.

13. The vehicle of claim 11, wherein the seat bottom includes a base plate having slots that slidably receive corresponding cleats to limit an amount of forward travel of the seat bottom.

14. The vehicle of claim 10, wherein the vertically extending portion is disposed between the back wall panel and a cargo bed of the vehicle.

15. The vehicle of claim 10, wherein the horizontally extending portion is disposed between the floor panel and the cargo bed of the vehicle.

16. The vehicle of claim 8, wherein the outboard seats are movable between an outboard seating position and an outboard stowed position, and wherein the outboard seats are disposed in compartments beneath the floor panel when the outboard seats are in the outboard stowed position.

17. The vehicle of claim 16, wherein at least a portion of each of the compartments is vertically aligned with a propshaft disposed below the floor panel, the propshaft being drivingly coupled to a rear axle of the vehicle.

* * * * *